United States Patent [19]
Wright

[11] Patent Number: 5,478,625
[45] Date of Patent: Dec. 26, 1995

[54] VEHICLE DRIP MAT

[76] Inventor: Daryl M. Wright, R.D. #1, Box 198K, Little Falls, N.Y. 13365

[21] Appl. No.: 320,338

[22] Filed: Oct. 11, 1994

[51] Int. Cl.⁶ .................................................. B32B 1/04
[52] U.S. Cl. ..................... 428/119; 184/106; 180/69.1; 220/573; 296/38
[58] Field of Search .................. 428/119, 81; 184/106; 296/38; 180/69.1; 220/573

Primary Examiner—Alexander S. Thomas

[57] ABSTRACT

A vehicle drip mat comprising a block of elastomeric material in a rectangular configuration, the block having a lower planar surface and an upper surface, the block having long parallel side edges and short parallel front and rear edges; a pair of side walls extending upwardly from the side edges, the side walls being parallel with each other along the length of the block; parallel front and rear walls along the front and rear edges coupling the side walls, the front wall being tapered from a point at its forward edge with the lower surface of the point co-extensive with the lower surface of the block and the highest point of taper being co-extensive with the upper edges of the side wall; and the upper surface of the block being formed with undulations having peaks and valleys running longitudinally, parallel with the side walls.

5 Claims, 4 Drawing Sheets

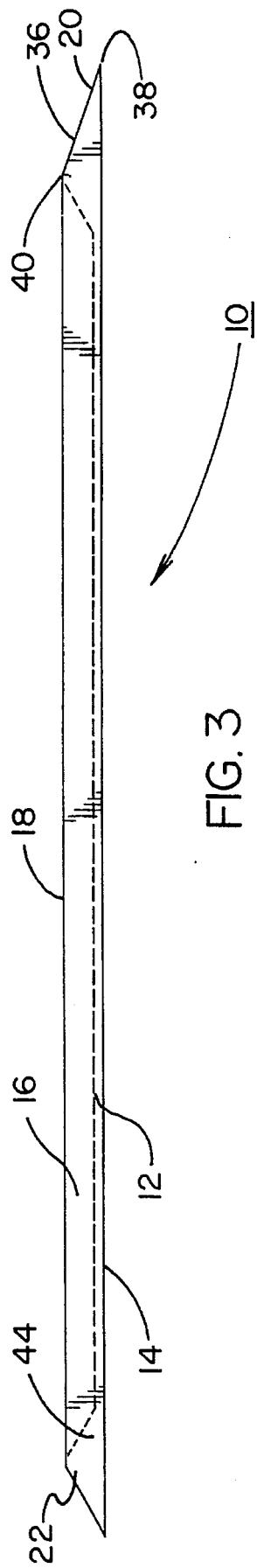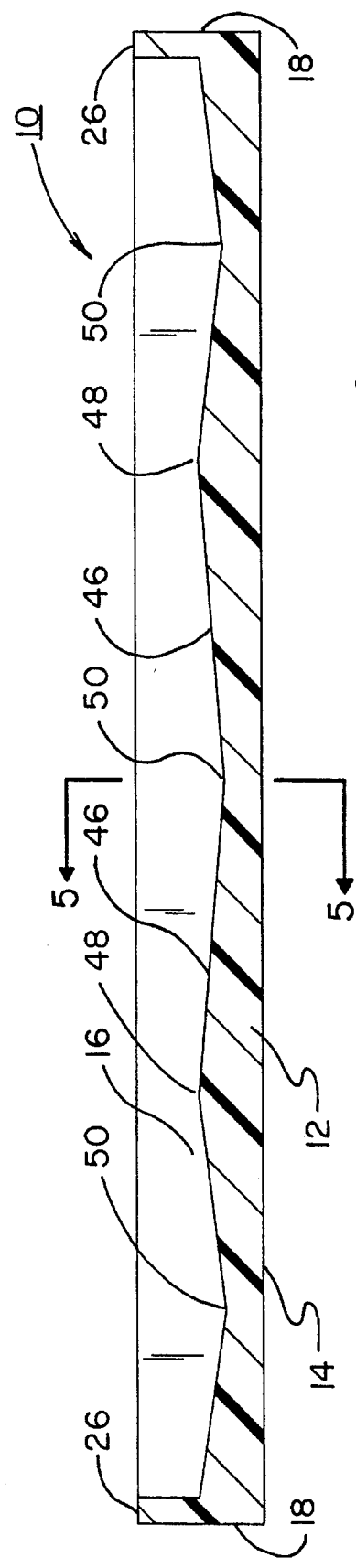

VEHICLE DRIP MAT

BACKGROUND OF THE INVENTION

1. Field of the Invention

The present invention relates to a vehicle drip mat and more particularly pertains to collecting and discharging thawing snow and ice as it melts from a car in a garage.

2. Description of the Prior Art

The use of mats for collecting liquids of various types for various purposes is known in the prior art. More specifically, mats for collecting liquids of various types for various purposes heretofore devised and utilized for the purpose of collecting residue liquids which may drip into a region by devices of various designs and constructions are known to consist basically of familiar, expected and obvious structural configurations, notwithstanding the myriad of designs encompassed by the crowded prior art which have been developed for the fulfillment of countless objectives and requirements.

By way of example, the prior art in U.S. Pat. No. 3,722,626 to Stack discloses a carport oil drip mat.

U.S. Pat. No. 4,798,754 to Tomek discloses an oil-absorbent floor mat.

U.S. Pat. No. 4,875,537 to Garnatz discloses a disposable oil absorbent drip pad assembly for a vehicle.

U.S. Pat. No. 4,936,418 to Clausen discloses an oil drip collector.

Lastly, U.S. Pat. No. 5,020,638 discloses a drip absorbing system.

In this respect, the vehicle drip mat according to the present invention substantially departs from the conventional concepts and designs of the prior art, and in so doing provides an apparatus primarily developed for the purpose of collecting and discharging thawing snow and ice as it melts from a car in a garage.

Therefore, it can be appreciated that there exists a continuing need for a new and improved vehicle drip mat which can be used for collecting and discharging thawing snow and ice as it melts from a car in a garage. In this regard, the present invention substantially fulfills this need.

SUMMARY OF THE INVENTION

In view of the foregoing disadvantages inherent in the known types of mats for collecting liquids of various types for various purposes now present in the prior art, the present invention provides an improved vehicle drip mat. As such, the general purpose of the present invention, which will be described subsequently in greater detail, is to provide a new and improved vehicle drip mat apparatus and method which has all the advantages of the prior art and none of the disadvantages.

To attain this, the present invention essentially comprises a new and improved vehicle drip mat comprising, in combination, a block of elastomeric material in a rectangular configuration, the block having a lower planar surface and an upper surface, the block having long parallel side edges and short parallel front and rear edges; a pair of side walls extending upwardly from the side edges, the side walls being parallel with each other along the length of the block, the side walls constituting about 50 percent of the height of the block; parallel front and rear walls along the front and rear edges coupling the side walls, the front and rear walls being between about one-third and one-half the length of the side walls, the front wall being tapered from a point at its forward edge with the lower surface of the point co-extensive with the lower surface of the block and the highest point of taper being co-extensive with the upper edges of the side wall; and the upper surface of the block being formed with undulations having peaks and valleys running longitudinally, parallel with the side walls, the block being formed of elastomeric material selected from the class of elastomeric materials including plastic, natural rubber, synthetic rubber and blends thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle drip mat which has all the advantages of the prior art mats for collecting liquids of various types for various purposes and none of the disadvantages.

It is another object of the present invention to provide a new and improved vehicle drip mat which may be easily and efficiently manufactured and marketed.

It is a further object of the present invention to provide a new and improved vehicle drip mat which is of a durable and reliable construction.

An even further object of the present invention is to provide a new and improved vehicle drip mat which is susceptible of a low cost of manufacture with regard to both materials and labor, and which accordingly is then susceptible of low prices of sale to the consuming public, thereby making such mats for collecting liquids of various types for various purposes economically available to the buying public.

Still yet another object of the present invention is to provide a new and improved vehicle drip mat which provides in the apparatuses and methods of the prior art some of the advantages thereof, while simultaneously overcoming some of the disadvantages normally associated therewith.

Still another object of the present invention is to collect and discharge thawing snow and ice as it melts from a car in a garage.

Lastly, it is an object of the present invention to provide a new and improved vehicle drip mat comprising a block of elastomeric material in a rectangular configuration, the block having a lower planar surface and an upper surface, the block having long parallel side edges and short parallel front and rear edges; a pair of side walls extending upwardly from the side edges, the side walls being parallel with each other along the length of the block; parallel front and rear walls along the front and rear edges coupling the side walls, the front wall being tapered from a point at its forward edge with the lower surface of the point co-extensive with the lower surface of the block and the highest point of taper being co-extensive with the upper edges of the side wall; and the upper surface of the block being formed with undulations having peaks and valleys running longitudinally, parallel with the side walls.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view of the device shown in FIGS. 1 and 2.

FIG. 4 is a cross-sectional view taken along line 4—4 of FIG. 2.

DESCRIPTION OF THE PREFERRED EMBODIMENT

Figure 1:
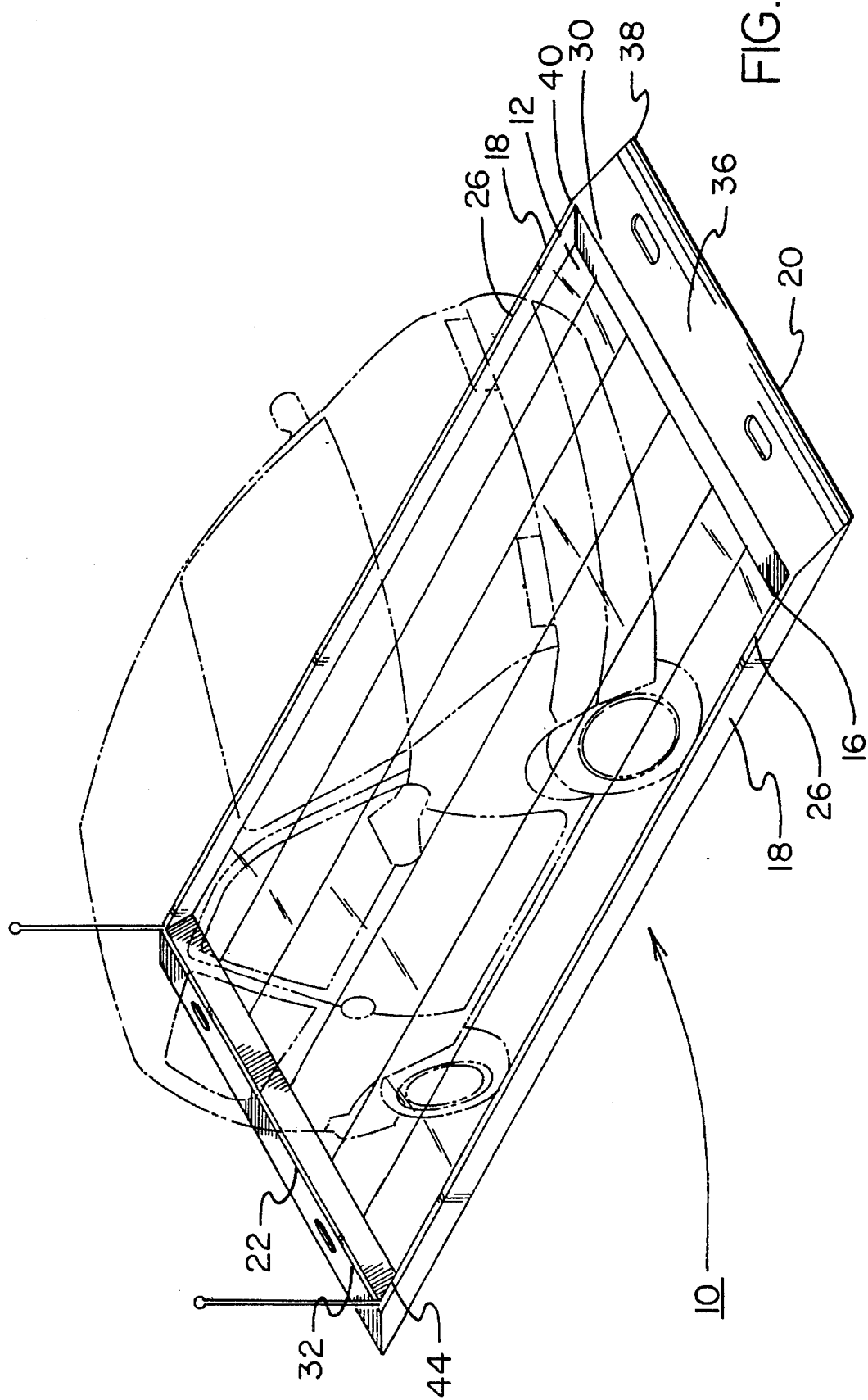
FIG. 1 is a perspective illustration of the preferred embodiment of the new and improved vehicle drip mat constructed in accordance with the principles of the present invention.
Figure 2:
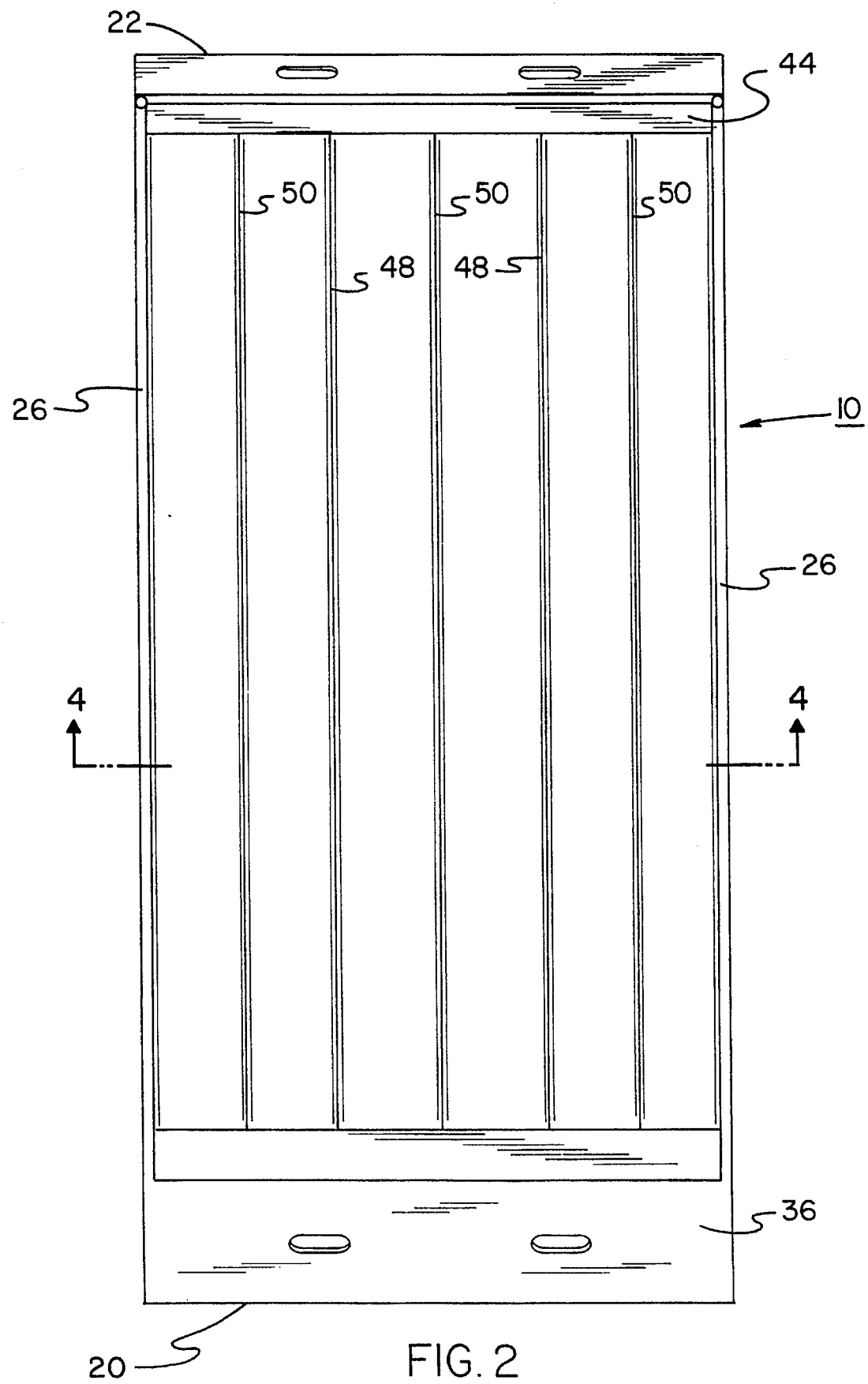
FIG. 2 is a top elevational view of the device shown in FIG. 1.
Figure 5:
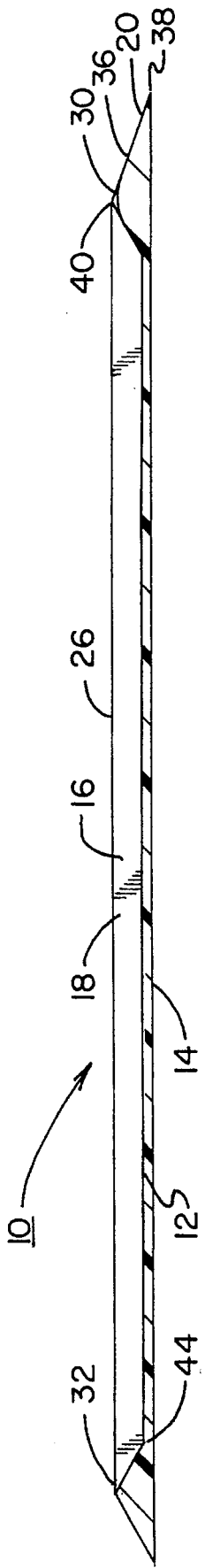
FIG. 5 is a cross-sectional view of the device taken along line 5–5 of FIG. 4.
Figure 6:
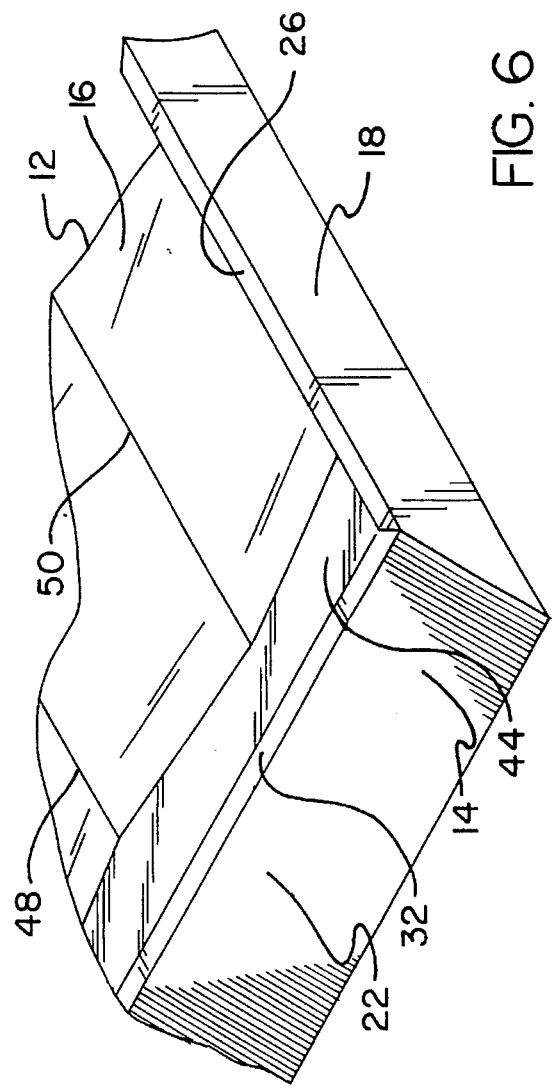
FIG. 6 is a perspective illustration of a corner of the device of the prior Figure. The same reference numerals refer to the same parts throughout the various Figures.

With reference now to the drawings, and in particular to FIG. 1 thereof, a new and improved vehicle drip mat embodying the principles and concepts of the present invention and generally designated by the reference numeral 10 will be described.

The present invention, the new and improved vehicle drip mat, is a system comprised of a plurality of components. Such components, in their broadest context, include a block, side walls, front and rear walls, and a contoured upper surface. Such individual components are specifically configured and correlated one with respect to the other so as to attain the desired objectives.

More specifically, it will be noted that the system 10 of the present invention is a block 12. The block is preferably formed of an elastomeric material. It is in a generally rectangular configuration. It has a lower planar surface 14 and an upper surface 16. The block also has long parallel side edges 18 and short parallel front and rear edges 20, 22 coupling the side edges.

Next provided are a pair of side walls 26. The side walls extend upwardly from the side edges. The side walls are parallel with each other along the length of the block. The side walls constitute about fifty percent, plus or minus ten percent, of the height of the block.

Next provided are a front wall 30 and a rear wall 32. Such front and rear walls are parallel with respect to each other. They are located along the front and rear edges respectively. The front and rear walls couple the side walls. The front and rear walls are between about one-third and one-half the length of the sidewalls.

The front wall is formed with a taper 36. The taper extends from a point 38 at the forward edge of the block. The lower surface of the point is co-extensive with the lower surface of the block. The highest point 40 of the taper is co-extensive with the upper edges of the side walls adjacent thereto. The taper allows a car to be driven up the tapering portion of the block for being positioned over the mat for proper functioning thereof.

The rear wall, like the front wall, is also preferably formed with a taper 36. Such taper extends from a point 38 at the forward end of the block like at the front wall. And again, the lower surface of the point is coextensive with the lower surface of the block. The highest point 40 of the taper, is also coextensive with the upper edges of the side wall adjacent thereto. This second taper allows a car to be driven up the tapering portion of the block either from the front of the block or the rear of the block to allow it to be positioned over the mat for proper functioning of the mat. This allows entering from either or both directions or, in the alternative, the car leaving the mat to beyond.

In the taper 36 of the mat, front and rear, one or a plurality of apertures are formed therethrough. Such apertures are preferably in the form of oval slots to allow the grasping of the mat by a user for moving it from one location to another prior to having a car positioned thereon for use.

A final structural aspect of the invention can be most readily seen in FIG. 1. These are the presence of elongated rods extending upwardly from the rear corners of the mat. By placing these at a rearmost region and a laterally outboardmost region visual markers will have been created so that a person backing his vehicle onto the mat will be able to see the termination points of the mat where water collection may occur. As a result, the use of the mat is simplified, particularly during one-person operation.

The block is preferably fabricated of an elastomeric material. Such elastomeric material is preferably selected from the class of elastomers including plastic, natural rubber, synthetic rubber and blends thereof.

Millions of people park their cars in a garage during the winter months. Although the vehicle may be free from snow and ice upon exiting the garage, winter driving causes frozen water and snow to accumulate in the wheel wells and under the frame. When the vehicle is returned to the garage, this melts onto the floor. With enough water, this could present a great danger to the wooden structure of the garage and even the concrete floor. Additionally, the salt and sand will remain after the snow has melted, leaving a heavy layer of winter grit to be swept clean. Clearly, what is needed is a way to protect the floor, one where the dirty water could be collected and discharged by the owner at a convenient time. That is why the present invention has been conceived. The present invention is a durable rubber floor covering that can be installed directly on the garage floor. Whenever a vehicle enters the garage, the snow, ice and residual water will drain and collect in it for later disposal.

The present invention is fabricated from a resilient and weather-resistant rubber compound. It has a thin, flat base and four raised sides. The leading edge where the vehicle enters the garage has a curved profile. This helps to keep the edge from being worn by driving over it. The sides are high enough to prevent the melted snow from leaking onto other areas of the floor. The present invention can be produced in almost any size to suit the myriad of vehicles currently available, but standard sizes to fill the most demanding needs are more practical.

The present invention is capable of preventing the melted snow from damaging a garage floor. It helps to keep the floor free from the buildup of dirt and salt. It can even be removed and washed with a garden hose, leaving the garage floor completely clean. With its clever features, ease of use, and clear advantages, the present invention is a practical wintertime addition to any garage.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved vehicle drip mat comprising, in combination:

a block of elastomeric material in a rectangular configuration, the block having a lower planar surface and an upper surface, the block having long parallel side edges and short parallel front and rear edges;

a pair of side walls extending upwardly from the side edges, the side walls being parallel with each other along the length of the block, the side walls constituting about 50 percent of the height of the block;

parallel front and rear walls along the front and rear edges coupling the side walls, the front and rear walls being less than one-half the length of the side walls and greater than one-third the length of the side walls, the front wall being tapered from a point at its forward edge with the lower surface of the point co-extensive with the lower surface of the block and the highest point of taper being co-extensive with the upper edges of the side wall; and the upper surface of the block being formed with undulations having peaks and valleys running longitudinally, parallel with the side walls, the block being formed of elastomeric material selected from the group consisting of plastic, natural rubber, synthetic rubber and blends thereof.

2. A vehicle drip mat comprising:

a block of elastomeric material in a rectangular configuration, the block having a lower planar surface and an upper surface, the block having long parallel side edges and short parallel front and rear edges;

a pair of side walls extending upwardly from the side edges, the side walls being parallel with each other along the length of the block;

parallel front and rear walls along the front and rear edges coupling the side walls, the front wall being tapered from a point at its forward edge with the lower surface of the point co-extensive with the lower surface of the block and the highest point of taper being co-extensive with the upper edges of the side wall; and the upper surface of the block being formed with undulations having peaks and valleys running longitudinally, parallel with the side walls.

3. The device as set forth in claim 2 wherein the block is formed of elastomeric material selected from the group consisting of plastic, natural rubber, synthetic rubber and blends thereof.

4. The device as set forth in claim 2 wherein the front and rear walls are less than one-half the length of side walls and greater than one-third the length of the side walls.

5. The device as set forth in claim 2 wherein the side walls constitute about 50 percent of the height of the device.

* * * * *